US010793286B1

(12) United States Patent
Carrico et al.

(10) Patent No.: US 10,793,286 B1
(45) Date of Patent: Oct. 6, 2020

(54) VISION BASED AUTONOMOUS LANDING USING FLIGHT PATH VECTOR

(71) Applicant: Rockwell Collins, Inc., Cedar Rapids, IA (US)

(72) Inventors: Matthew J. Carrico, Mount Vernon, IA (US); Carlo L. Tiana, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/110,034

(22) Filed: Aug. 23, 2018

(51) Int. Cl.
| | |
|---|---|
| *B64D 45/08* | (2006.01) |
| *G06T 7/33* | (2017.01) |
| *G05D 1/08* | (2006.01) |
| *G05D 1/06* | (2006.01) |
| *G06N 3/04* | (2006.01) |

(Continued)

(52) U.S. Cl.
CPC ......... *B64D 45/08* (2013.01); *G02B 27/0101* (2013.01); *G05D 1/0653* (2013.01); *G05D 1/0825* (2013.01); *G06T 7/33* (2017.01); *B64D 47/08* (2013.01); *G02B 2027/014* (2013.01); *G02B 2027/0141* (2013.01); *G06N 3/0454* (2013.01); *G06T 2207/10016* (2013.01); *G06T 2207/10032* (2013.01);

(Continued)

(58) Field of Classification Search
CPC ........ G06N 3/02–105; B64D 45/00–08; B64D 47/08; B64D 45/08; G06T 7/00–97; G06T 9/00–40; G06T 2207/10032–10044; G06T 2207/30241; G05D 1/0676; G05D 1/0088; G05D 1/10–1064; G01C 23/005; B64C 2201/187

USPC ....................................................... 701/3–18
See application file for complete search history.

(56) References Cited

U.S. PATENT DOCUMENTS

| | | | |
|---|---|---|---|
| 6,430,480 B1 * | 8/2002 | Ammar ................. | F41G 7/2226 |
| | | | 701/16 |
| 9,058,510 B1 * | 6/2015 | Bold ....................... | G06T 11/00 |

(Continued)

FOREIGN PATENT DOCUMENTS

| | | | | |
|---|---|---|---|---|
| EP | 0505236 A2 * | 9/1992 | ........... | G05B 13/027 |
| WO | WO-2018117872 A1 * | 6/2018 | ............... | G09B 9/24 |

OTHER PUBLICATIONS

H. Baomar and P. J. Bentley, "Autonomous navigation and landing of large jets using Artificial Neural Networks and learning by imitation," 2017 IEEE Symposium Series on Computational Intelligence (SSCI), Honolulu, HI, 2017, pp. 1-10. (Year: 2017).*

(Continued)

*Primary Examiner* — Jeffrey C Boomer
*Assistant Examiner* — Paul Allen
(74) *Attorney, Agent, or Firm* — Suiter Swantz pc llo

(57) ABSTRACT

An on-board computer system includes a first neural network trained to receive a video stream of a landing approach, runway data, and aircraft state data and identify environmental landmarks corresponding to components of the runway and environmental obstacles that might interfere with autonomous landing. The on-board computer system also includes a second neural network that receives a flight path vector and a flight director corresponding to vectors based on the aircraft energy state and a desired aircraft flight path respectively. The second neural network determines flight control inputs to bring the flight path vector into conformity with the flight director.

14 Claims, 5 Drawing Sheets

(51) Int. Cl.
*B64D 47/08* (2006.01)
*G02B 27/01* (2006.01)

(52) U.S. Cl.
CPC ............... *G06T 2207/20084* (2013.01); *G06T 2207/30241* (2013.01); *G06T 2207/30261* (2013.01)

(56) References Cited

U.S. PATENT DOCUMENTS

| | | | | |
|---|---|---|---|---|
| 9,489,575 | B1* | 11/2016 | Whalen | G01S 13/94 |
| 2005/0033489 | A1* | 2/2005 | Tezuka | G05D 1/0684 |
| | | | | 701/16 |
| 2005/0232512 | A1* | 10/2005 | Luk | G06K 9/6293 |
| | | | | 382/276 |
| 2006/0025901 | A1* | 2/2006 | Demortier | G05D 1/0676 |
| | | | | 701/16 |
| 2010/0036551 | A1* | 2/2010 | Lacaze | G01C 23/00 |
| | | | | 701/18 |
| 2010/0113149 | A1* | 5/2010 | Suddreth | G01C 23/00 |
| | | | | 463/31 |
| 2013/0035810 | A1* | 2/2013 | Spinelli | G05D 1/0676 |
| | | | | 701/17 |
| 2013/0204470 | A1* | 8/2013 | Luckner | G08G 5/025 |
| | | | | 701/18 |
| 2015/0032299 | A1* | 1/2015 | Puyou | G05D 1/0676 |
| | | | | 701/16 |
| 2016/0026189 | A1* | 1/2016 | Boada-Bauxell | G05D 1/0676 |
| | | | | 348/144 |
| 2016/0090193 | A1* | 3/2016 | He | B64D 45/04 |
| | | | | 340/971 |
| 2016/0247406 | A1* | 8/2016 | Khatwa | G05D 1/0061 |
| 2017/0053539 | A1* | 2/2017 | Feyereisen | G08G 5/0021 |
| 2017/0138759 | A1* | 5/2017 | Turner | B64D 43/02 |
| 2017/0158349 | A1* | 6/2017 | Scacchi | G01C 23/00 |
| | | | | 463/31 |
| 2017/0249851 | A1* | 8/2017 | Marques | G08G 5/0021 |
| 2017/0301247 | A1* | 10/2017 | Sherry | G08G 5/025 |
| 2018/0024237 | A1* | 1/2018 | Laplace | G06T 11/00 |
| 2018/0118372 | A1* | 5/2018 | Boada-Bauxell | G01S 13/94 |
| 2018/0281988 | A1* | 10/2018 | Tellechea | B64D 43/02 |

OTHER PUBLICATIONS

Cox, C., Stepniewski, S., Jorgensen, C., Saeks, R. and Lewis, C. (1999), On the design of a neural network autolander. Int. J. Robust Nonlinear Control, 9: 1071-1096.; First published:Dec. 2, 1999 (Year: 1999).*

Golden—English description of EP0505236A2, via Espacenet Patent Translate, retrieved May 12, 2020 (Year: 2020).*

* cited by examiner

VISION BASED AUTONOMOUS LANDING USING FLIGHT PATH VECTOR

BACKGROUND

Vision-based landing systems for aircraft are based on a pilot observing the environment and navigational aids, and manipulating the airplane controls in response to the observed environment as well as visual cues sensed and computed by on-board systems presented on a display in a cockpit. In aircraft equipped with a head-up display (HUD), the sensed and computed visual cues are provided on the HUD, enabling the pilot to simultaneously see both the outside scene and the computed visual cues, correlated by virtue of the HUD being disposed in the eye-line of the pilot.

The visual cues presented on a HUD may include navigation data (e.g., lateral and vertical deviations), aircraft state data (heading, altitude, airspeed, etc.) and, in some aircraft, a flight path vector that indicates the current projected trajectory of the aircraft based on the aircraft's energy state. The flight path vector provides an easy-to-interpret indication of cross-track or along-track-error relative to the outside world (such as the runway when landing). Some systems further enhance the flight path vector utility by providing a computed guidance cue, or "flight director," that graphically indicates the corrections needed to stay on the intended approach path.

In an autonomous system, there is no pilot on-board to manipulate the pilot controls based on the visual cues.

SUMMARY

In one aspect, embodiments of the inventive concepts disclosed herein are directed to an on-board computer system including a first neural network trained to receive a video stream of a landing approach, runway data, and aircraft state data and identify environmental landmarks corresponding to components of the runway, airfield, or surrounding scene, and environmental obstacles that might interfere with autonomous landing.

In a further aspect, the on-board computer system includes a second neural network that receives a flight path vector and a flight director corresponding to vectors based on the aircraft energy state and a desired aircraft flight path respectively. The second neural network determines flight control inputs to bring the flight path vector into conformity with the flight director.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
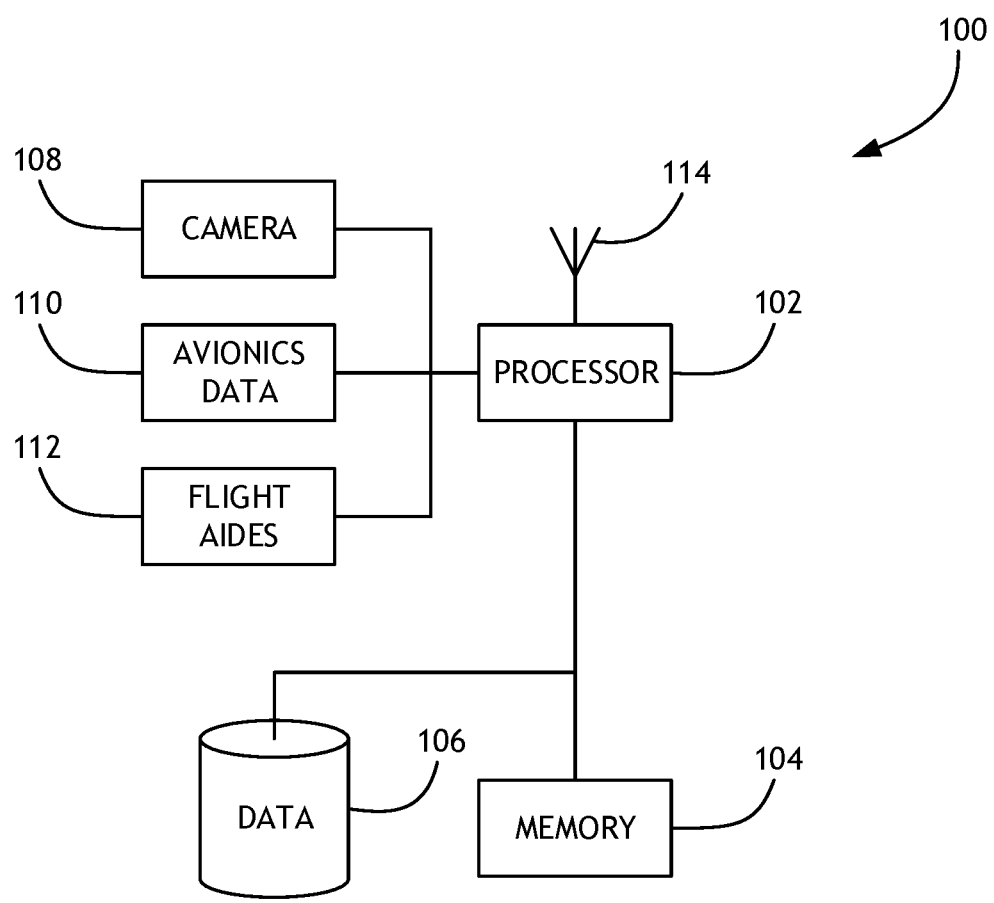
FIG. 1 shows a block diagram of an exemplary embodiment of a system for implementing the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a neural network configured to utilize computed and real-time visual information and navigational and landing aids from a head-up display (HUD), or which would normally be rendered on a HUD even when no HUD is actually present, to autonomously land an aircraft.

Referring to FIG. 1, a block diagram of an exemplary embodiment of a system 100 for implementing the inventive concepts disclosed herein is shown. The system 100 includes one or more processors 102 and memory 104 connected to the one or more processors 102 for storing processor executable code. In at least one embodiment, the system 100 may also include a data storage element 106 connected to the one or more processors 102 for storing data from one or more references sources.

The system 100 includes one or more cameras 108 connected to the one or more processors 102. The one or more cameras 108 may include visible light cameras, infrared cameras, or other cameras with high or low resolution, low visibility, and low-light capabilities suitable for capturing environmental images to identify a runway in all conditions where an aircraft is likely to operate. The one or more cameras 108 may also include any type of sensor that generates a visually interpretable image, such as radio-frequency sensor, e.g. RADAR, or LIDAR, or a synthetic camera generating a real-world image from a computer database. The one or more processors 102 may also receive avionics data 110, either directly from one or more one-board sensors or from a separate system that compiles such avionics data 110 from such sensors for the one or more processors 102. Furthermore, the one or more processors 102 receives data corresponding to one or more flight aids 112.

The one or more processors 102 execute one or more artificial neural networks, potentially in more than one processing layer, to identify and track markers corresponding to important real-world landmarks in streaming images from the one or more cameras 108. The neural networks also receive or identify flight aids 112 that provide a visual indication of the energy state of the aircraft that would ordinary be produced on a HUD. The neural networks correlate certain of the flight aids 112 to the real-world landmarks to calculate flight control adjustments as more fully described herein.

In at least one embodiment, the system 100 also includes one or more data communication elements 114, either wired or wireless. In at least one embodiment, such data communication elements 114 may include data paths for integrating the system 100 with other avionics systems in an aircraft. In at least one embodiment, the data communication elements 114 may provide data from one or more guidance mechanisms such as the Instrument Landing System (ILS), the Ground-Based Augmentation System (GBAS), Global Navigation Satellite System (GNSS), GNSS Landing System (GLS), inertial reference system (IRS), and/or an air data system.

In at least one embodiment, the one or more cameras 108 are primary configured for capturing images corresponding to a view as would be seen by the pilot through a HUD. Because such a camera angle may be impossible or impractical in a real-world application, in at least one embodiment the one or more processors 102 may apply a transformation to at least one camera 108 stream to convert the stream into a close approximation of the pilot's view through the HUD.

Figure 2:
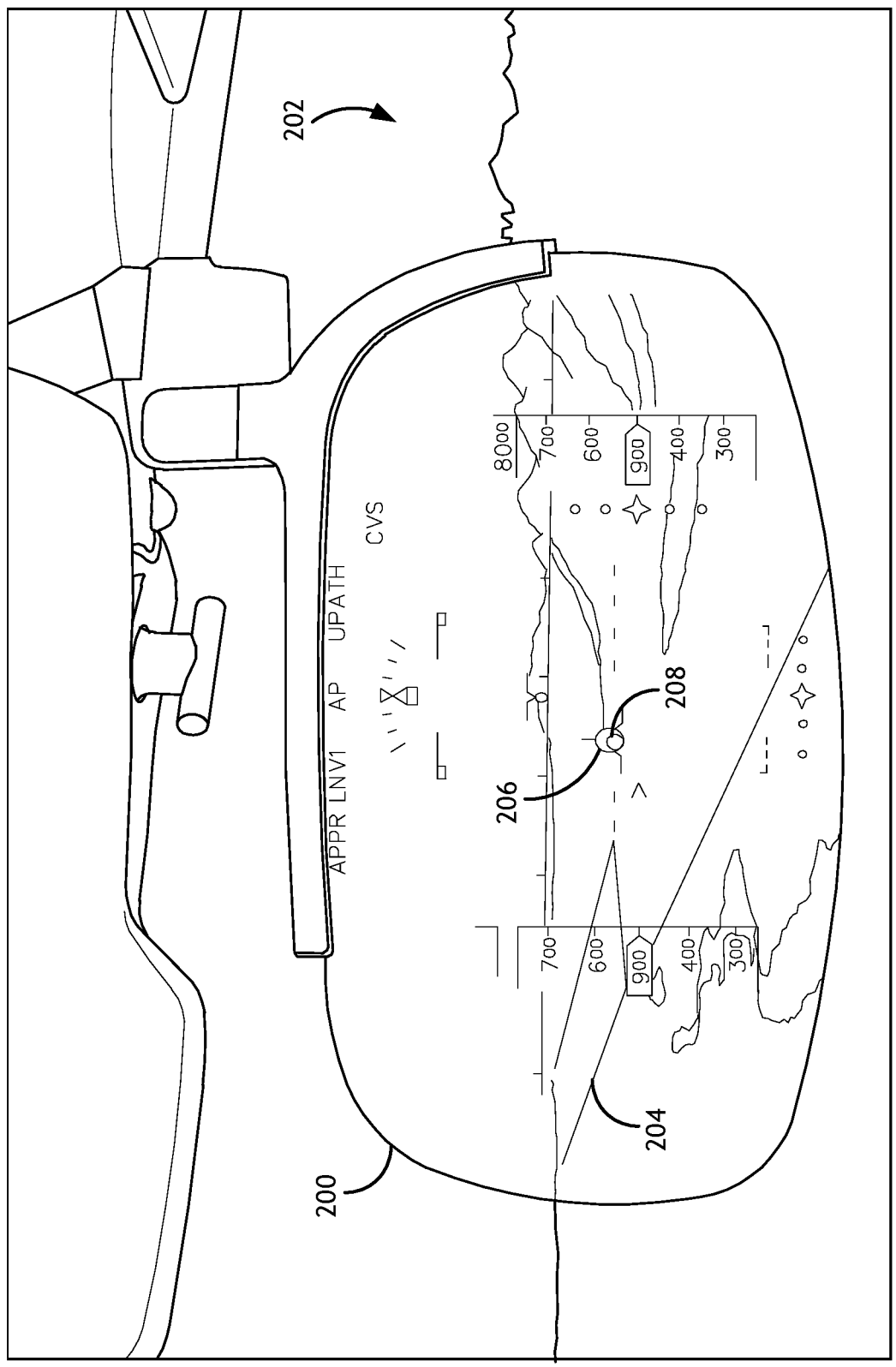
FIG. 2 shows an environmental view as presented to a pilot.

Referring to FIG. 2, an environmental view as presented to a pilot is shown. A HUD 200 useful in at least one embodiment allows flight data and aircraft state data to be visually represented, overlaid onto the real-world background 202 where a runway is visible 204. A flight path vector indicator 206 represents the attitude and projected vector of the aircraft based on the current aircraft energy state and certain environmental factors known to the relevant avionics systems, either from on-board instruments or from remote sources or both. A flight director indicator 208 is a simplified representation of a necessary change to the flight path vector indicator 206 to place the aircraft on a vector corresponding to a desired flight path. The flight path vector indicator 206 is designed to be viewed by a pilot, on the HUD 200, in the context of the real-world background 202. Likewise, the flight path vector indicator 206 and flight director indicator 208 are designed to be utilized together to provide a simplified indication to the pilot that the real aircraft vector is aligned to a desired aircraft vector, or the control inputs necessary to achieve such alignment.

A computer system, such as a neural network, configured to utilize information such as rendered on the HUD 200 to autonomously land the aircraft may not have access to all the information available to the pilot because the background 202 and runway 204 are not part of the rendered image on the HUD 200. The computer system would therefore not have all of the components available to the pilot correlated in a single image. Some HUD systems include the ability to add a video overlay of the outside world to the HUD image. The video overlay may comprise a captured image via a camera or a synthetic image created from a database with knowledge of location, altitude, and attitude. A system implementing embodiments of the inventive concepts disclosed herein utilize such video overlay as described herein.

Figure 3:
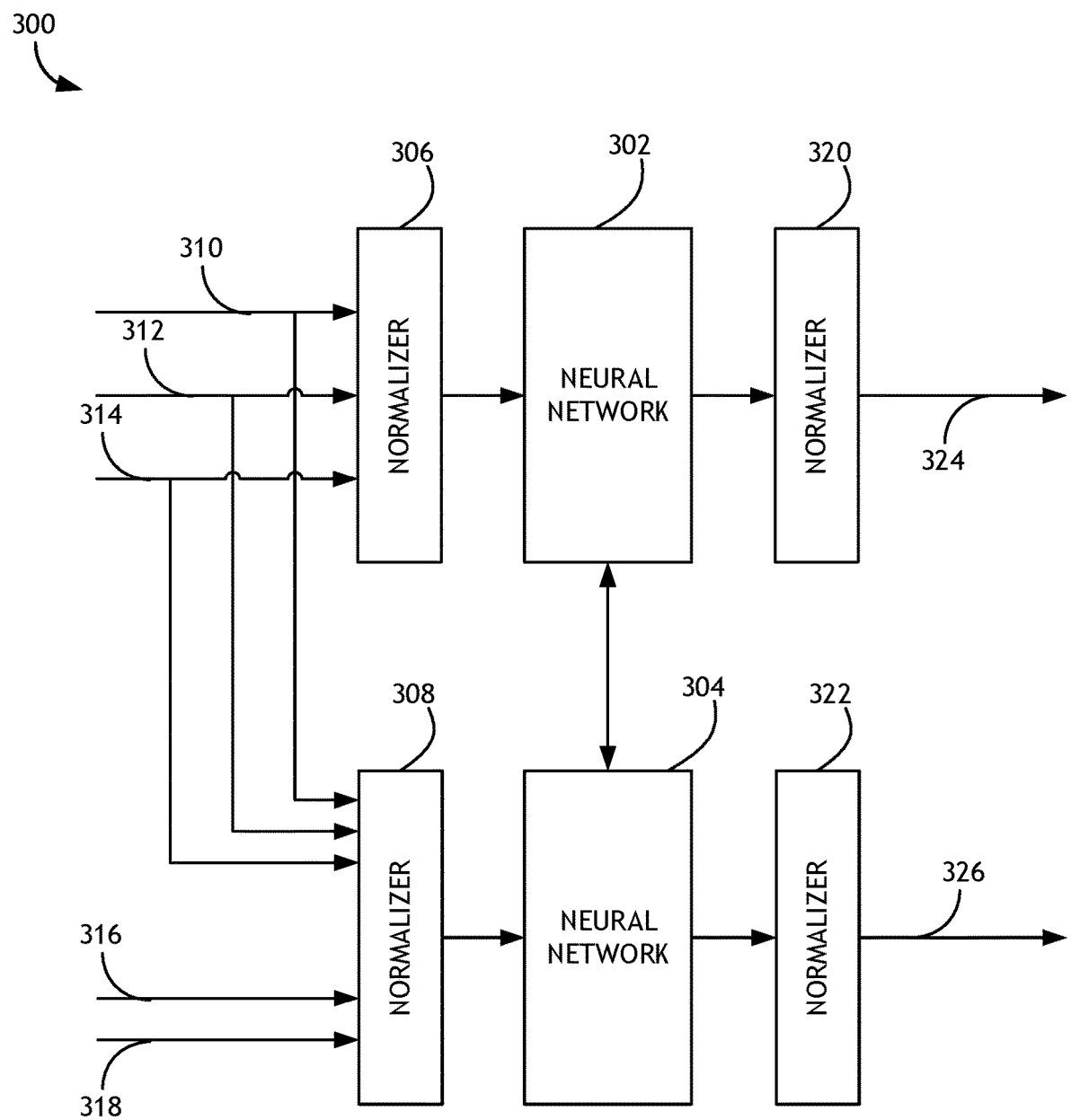
FIG. 3 shows a block diagram of an exemplary embodiment of the inventive concepts disclosed herein.

Referring to FIG. 3, a block diagram of an exemplary embodiment of the inventive concepts disclosed herein is shown. A neural network system 300 may include one or more neural networks 302, 304. A first neural network 302 receives a plurality of inputs 310, 312, 314 such as a video stream 310 oriented for landing, aircraft state data 312 corresponding to the energy state of the aircraft, and/or runway data 314 from a data storage source. In at least one embodiment, the inputs 310, 312, 314 are delivered to the first neural network 302 by a first normalizing element 306 configured to constrain and transform the inputs 310, 312, 314 to expected predefined ranges.

In at least one embodiment, the first neural network 302 is trained to perform relatively low frequency identification and tracking of a runway based on the video stream 310 and runway data 314 to determined the desired touchdown point on the runway. In at least one embodiment, the first neural network 302 may be trained to plot a desired course based on the aircraft state data 312 to conform to desired touchdown point. In addition, the first neural network 302 may be trained to determine if the aircraft state data 312 indicates the aircraft is within certain tolerances based on the identified runway and a current approach vector.

Alternatively, or in addition, the first neural network 302 may be configured and trained to classify images from the video stream 310 and determine if there is a runway at the intended landing point based on boundaries of a paved surface and corresponding runway data 314, and that the runway is clear of obstacles via image recognition techniques such as, but not limited to, relatively uniform or expected pixel coloration and pixel changes between images in the video stream 310 indicating the presence of a moving object on the runway or other unexpected irregularity on the runway. Outputs 324 from the first neural network 302 may thereby indicate if the landing environment is adequate and cleared.

Alternatively, or in addition, the first neural network 302 may be configured and trained to classify images from the video stream 310 and determine if there are environmental features other than a runway that indicate the aircraft is headed to its intended landing point; for example: landmarks, approach aids or terrain and artificial features such as those any pilot might use to confirm the general location and heading of the aircraft.

In at least one embodiment, the first neural network 302 produces a set of flight control adjustments as an output 324 to bring the aircraft state data 312 (including airspeed, altitude, orientation, engine speed, flap settings, etc.) into conformity with the desired touchdown point.

In at least one embodiment, the first neural network 302 may also receive inputs such as ILS, GBAS, GNSS, GLS, IRS, and/or an air data system data to augment the video stream 310.

In at least one embodiment, the neural network system 300 includes a second neural network 304. the second neural network 304 receives one or more flight aids 316, 318 including a flight path vector indicator 316 and potentially a flight director indicator 318. In at least one embodiment, the second neural network also receives the plurality of inputs 310, 312, 314. A second normalizer 308 may constrain and transform the inputs 310, 312, 314, 316, 318 to expected predefined ranges such as scaling all inputs 310, 312, 314, 316, 318 to order zero.

In one embodiment, the second neural network 304 is trained to perform relatively high frequency identification and tracking of the one or more flight aids 316, 318 to produce a set of flight control outputs 326 to bring the flight path vector indicator 316 into conformity with the flight director indicator 318.

In at least one embodiment, the second neural network 304 provides landing guidance commands to aircraft control surfaces, throttles, landing gears, flaps, speed brakes, etc. The second neural network 304 may receive the flight path vector indicator 316, a video image or stream of the landing environment (either real-time or rendered from stored data in conjunction with other sensor data), and optionally, the flight director indicator 318. In at least one embodiment, the second neural network 304 utilizes a regression algorithm to produce flight control outputs 326 to keep the flight path vector indicator 316 centered on the point of intended landing. Alternatively, or in addition, the first neural network 302 and/or the second neural network 304 may be configured and trained to mimic a pilot's functions when interpreting HUD cues with respect to the outside scene. In such embodiments, a goal based, reinforcement neural network approach may be employed with a "high reward" for keeping the flight vector indicator 316 centered.

In at least one embodiment, each of the neural network outputs 324, 326 may be constrained and/or transformed via corresponding normalizers 320, 322 such as scaling all of outputs 324, 326 to an original or expected unit value.

In at least one embodiment, the first neural network 302 and the second neural network 304 may share data either as inputs to the other neural network 302, 304 or to compare neural network outputs 324, 326. Alternatively, output from one or more processing layers of the first neural network 302 and the second neural network 304 may be provided as inputs to the other neural network 302, 304. Layers may be organized in a feed forward architecture where neurons (nodes) only receive inputs from the previous layer and deliver outputs only to the following layer, or a recurrent architecture, or some combination thereof. Each layer defines an activation function, comprised of neuron propagation functions, such as a Hyperbolic tangent function, a linear output function, and/or a logistic function, or some combination thereof.

In at least one embodiment, each of the first neural network 302 and the second neural network 304 may be organized into a plurality of processing layers. For example, the first neural network 302 may comprise one or more initial processing layers configured to identify a runway and components of the runway from the video stream 310 based on the runway data 314. Subsequent processing layers may be configured to identify disparities between the aircraft state data 312 and a necessary aircraft energy state to bring the aircraft to the runway. Furthermore, one or more final processing layers may convert the disparities the aircraft state data 312 and a necessary aircraft energy state into aircraft flight control outputs 324.

Likewise, in at least one exemplary embodiment, the second neural network 304 may comprise one or more initial processing layers configured and trained to identify components of the flight path vector indicator 316 and flight director indicator 318 such that the system 300 is easily integrated with other on-board avionics systems. Alternatively, the second neural network 304 may receive data used to produce the flight path vector indicator 316 and flight director indicator 318 to reduce processing complexity. One or more processing layers may be configured and trained to identify flight control outputs 326 to bring the flight path vector indicator 316 into conformity with the flight director indicator 318. As compared to the first neural network 302, the amount of processing and data recognition may be reduced, and the number of processing layers may be reduced, to produce a higher frequency of flight control outputs 326.

Furthermore, one or more processing layers of the second neural network 304 may receive as input the video stream 310, aircraft state data 312, and/or runway data 314, or alternatively data corresponding to components of such inputs 310, 312, 314 as identified by one or more processing layers of the first neural network 302.

Figure 4:
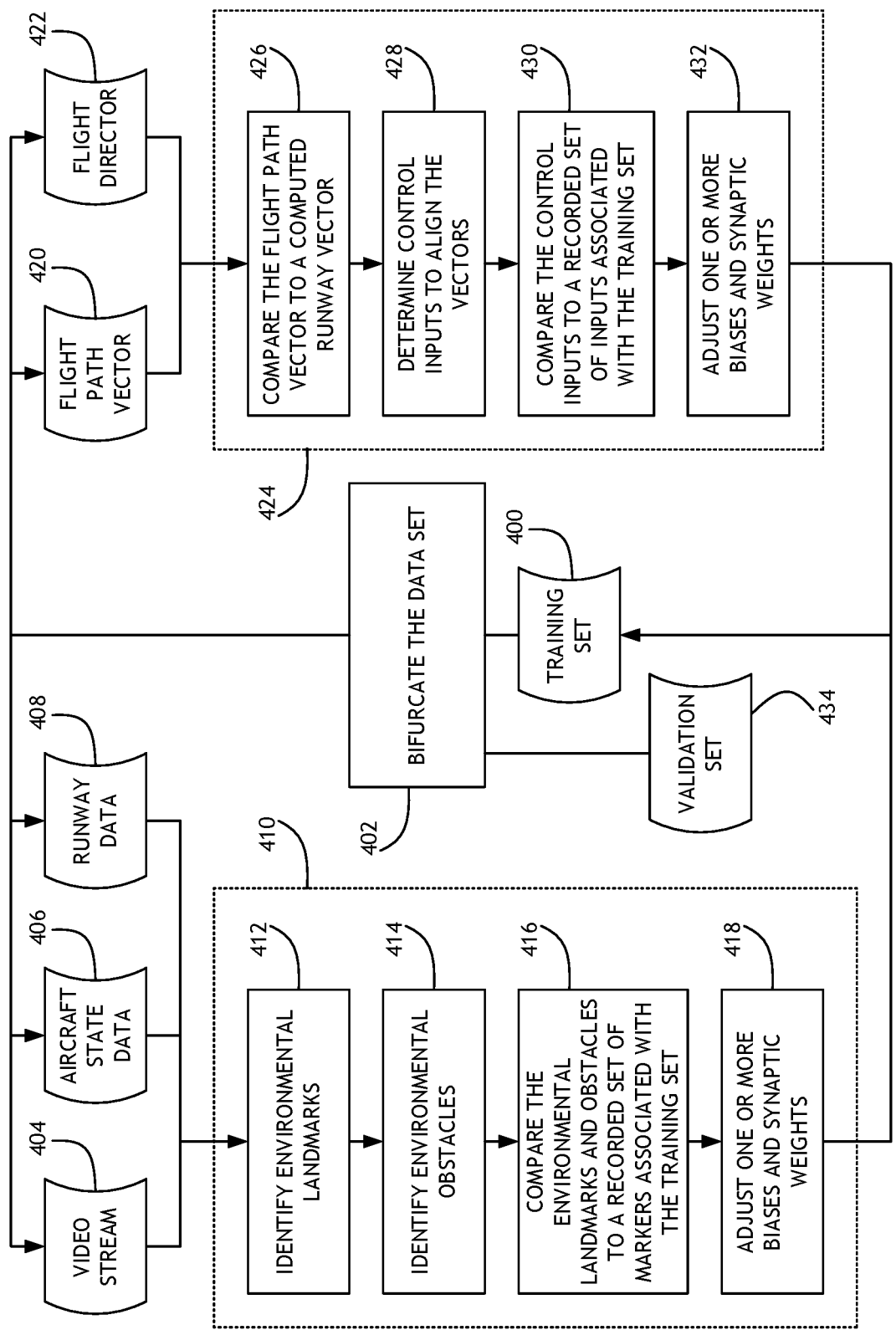
FIG. 4 shows a flowchart of a method for training a system according to the inventive concepts disclosed herein.

Referring to FIG. 4, a flowchart of a method for training a system according to the inventive concepts disclosed herein is shown. Neural networks 410, 424 utilize supervised learning conducted during the design phase to establish weighting factors and activation functions for each neural network 410, 424.

In at least one embodiment, training data sets 400 are iteratively supplied to the system and bifurcated 402 into data specifically directed to a first neural network 410 and to a second neural network 424. The training data sets 400 may comprise labeled examples of stable and unstable approaches under all foreseen operating conditions. In at least one embodiment, the training data sets 400 include recorded, calculated, or otherwise rendered data corresponding to a video stream 404, aircraft state data 406, runway data 408, flight path vectors 420, and potentially flight director states 422. Because all of the data points in any one training data set 400 are critically related in time (for example, recorded changes to a flight path vector 420 over time are only relevant with respect to aircraft state data 406, visual cues recorded in the video stream 404, and the state of the flight director 422 at that time or roughly contemporaneously), each data point may be associated with a coordinated time code.

In at least one embodiment, a first set of data includes a real or rendered video stream 404, aircraft state data 406, and runway data 408, and an indication if the set of data is a positive training data set (representing a stable approach to be emulated) or a negative training data set (representing an unstable approach to be avoided).

The first neural network 410 may be comprised of a plurality of processing layers. Each of the processing layers may be designed and trained for specific processing tasks. In at least one embodiment, the first neural network 410 may attempt to identify 412 environmental landmarks from the video stream 404. The specific environmental landmarks concerned herein are a runway specified by the runway data 408, and surrounding features to verify the identity of the runway. The first neural network 410 may also attempt to identify environmental obstacles, either in the same processing layers as used to identify 412 the environmental landmarks or in a subsequent processing layers where the results of such landmark identification 412 are important for obstacle identification 414. The first neural network 410 then compares 416 the identified 412 environmental landmarks with the labeled environmental landmarks of the training data set 400 including the corresponding video stream 404, and any identified 414 obstacles with any labeled obstacles of the training data set 400.

During supervised training, a designer may adjust 418 one or more input biases or synaptic weights of the nodes in one or more processing layers of the first neural network 410 according to a loss function that defines an expected performance. Alternatively, or in addition, the designer may utilize certain training data sets 400, categorized as selection data sets, to choose a predictive model for use by the neural networks 410, 424. During unsupervised training, the first neural network 410 adjust 418 one or more input biases or synaptic weights of the nodes in one or more processing layers according to an algorithm. In at least one embodiment, where the training data sets 400 include both stable and unstable approaches, the training algorithm may comprise a first component to minimize disparity with approaches labeled "stable" and a second component to prevent close approximation with approaches labeled "unstable." A person skilled in the art may appreciate that maximizing disparity with unstable approaches may be undesirable until the first neural network 410 has been sufficiently trained or designed so as to define constraints of normal operation within which both stable and unstable approaches are conceivable.

In at least one embodiment, training data sets 400 may be categorized based on a defined level of stability or instability, and provided in ascending order of convergence such that the disparities of between stable and unstable approaches diminish during training and necessary adjustments 418 presumably become smaller over time according to first and second order deviations of the corresponding loss function. The loss function may define error according to mean square, root mean square, normalized square, a weighted square, or some combination thereof, where the gradient of the loss function may be calculated via backpropagation.

In at least one embodiment, a second set of data provided to the second neural network 424 includes a real or rendered flight path vector 420 and flight director 422 and an indication if the set of data is a positive training data set or a negative training data set. In at least one embodiment, the second neural network 424 may attempt to identify an aircraft vector from a flight path vector 420 and compare the flight path vector 420 with runway vector necessary to direct the aircraft to a desired runway. The runway vector may be supplied to the second neural network 424 during supervised training or defined by the first neural network 410 based on corresponding aircraft state data 406 and runway data 408. Alternatively, the second neural network 424 may also receive such aircraft state data 406 and runway data 408, and potentially a video stream 404, to internally define a runway vector.

In at least one embodiment, the second neural network 424 also receives a real or rendered flight director 422. The flight director 422 is a simplified representation of a desired runway vector when view in the context of a corresponding flight path vector 420 and desired flight path including the desired runway. In such embodiment, comparing 426 the flight path vector 420 to the computed runway vector may comprise computing a disparity between the flight path vector 420 and the flight director 422.

The second neural network then determines 428 flight control inputs to align the flight path vector 420 with the runway vector or flight director 422 where appropriate. The second neural network 424 then compares 430 the determined flight control inputs to a recorded set of inputs from the training data set 400. Alternatively, or in addition, the second neural network 424 may compare 430 the determined flight control inputs to a set of inputs derived from corresponding changes to aircraft state data 406 which may include the actual control inputs from the pilot. In at least one embodiment, such comparison 430 may require the determined inputs to be compared to subsequent actual inputs or actual aircraft state data 406 as actual flight control inputs require time to execute and be reflected in changes to aircraft state data 406. The input biases and synaptic weights in the second neural network 424 are adjusted 432 based on the comparison 430.

As with the first neural network 410, during supervised training, a designer may adjust 432 the one or more input biases or synaptic weights of the nodes in one or more processing layers of the second neural network 410. During unsupervised training, the second neural network 424 adjust 432 the one or more input biases or synaptic weights of the nodes in one or more processing layers according to an algorithm. In at least one embodiment, where the training data sets 400 include both stable and unstable approaches, the training algorithm may comprise a first component to minimize disparity with approaches labeled "stable" and a second component to prevent close approximation with approaches labeled "unstable." Maximizing disparity with unstable approaches may be undesirable until the second neural network 424 has been sufficiently trained or designed so as to define constraints of normal operation within which both stable and unstable approaches are conceivable.

In at least one embodiment, training data sets 400 may be categorized based on a defined level of stability or instability, and provided in ascending order of convergence such that the disparities of between stable and unstable approaches diminish during training and necessary adjustments 418 presumably become smaller over time.

In at least one embodiment, the adjustments 418, 432 may be based on minimizing multidimensional loss functions, such as through first or second order derivatives. Alternatively, or in addition, the designers may iteratively simplify the process to focus on a single-dimension loss function at one time. Training algorithms suitable for embodiments of the present disclosure may include, but are not limited to, gradient descent where the loss function is iteratively limited to a single variable, Conjugate gradient, Newton's method, Quasi-Newton method, Levenberg-Marquardt, etc.

The training system iteratively supplies new training data sets 400 to further refine the input biases and synaptic weights until both the first neural network 410 and second neural network 424 consistently produce results conforming to the results specified by the corresponding training data sets 400. Once the designers are satisfied, the system may be tested with a plurality of validation data sets 434 which replicate or represent actual data that would be received during an actual landing, without any indication of the correct outcome. The validation data sets 434 and training data sets 400 may be derived from a pool of data sets using a statistical method to assign them into independent, but statistically representative, datasets. At the validation stage, the system would operate, in real time, without any of the adjustment 418, 432 steps. In at least one embodiment, the system may recognize a potentially unstable approach and execute a safe go-around.

Figure 5:
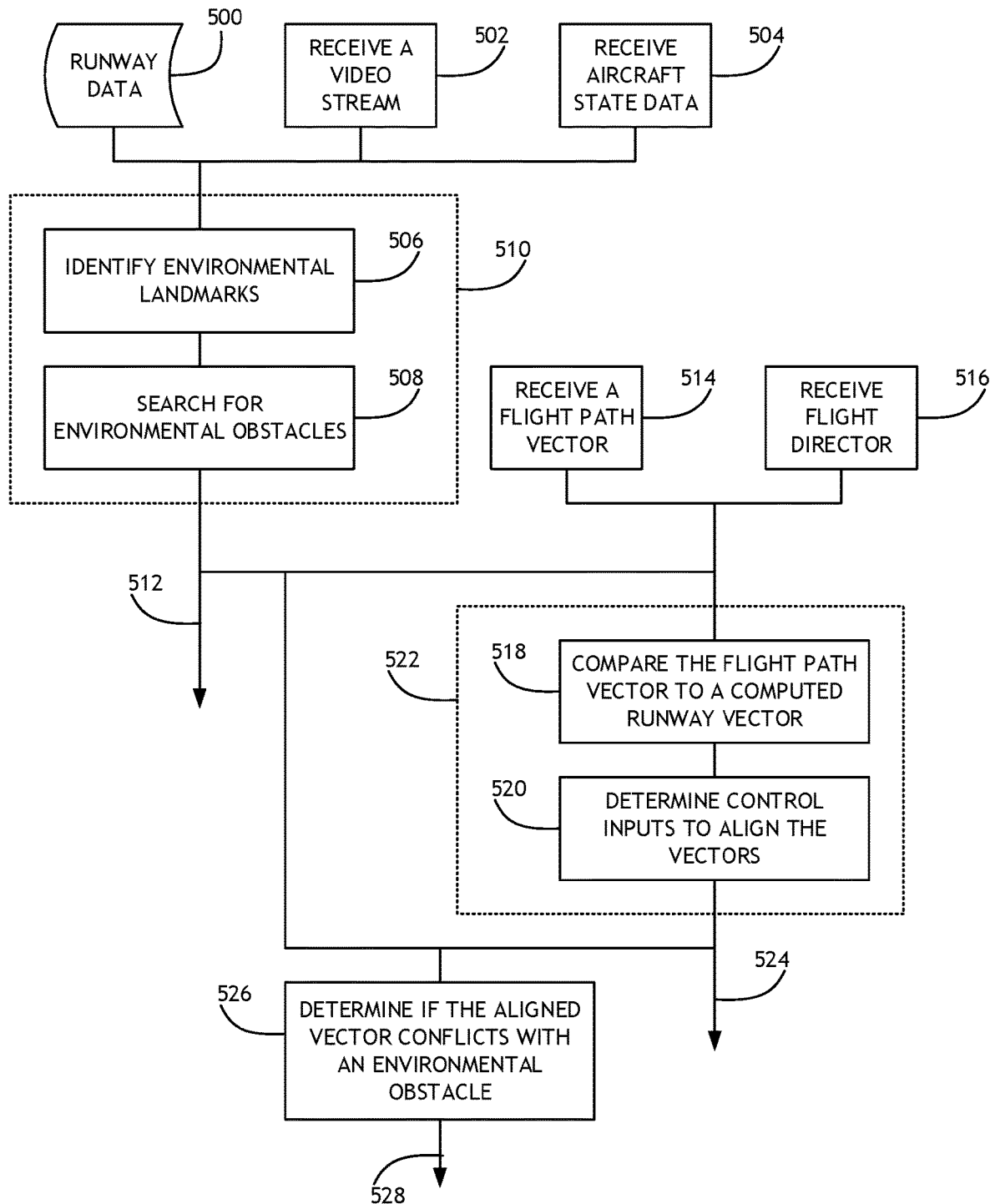
FIG. 5 shows a flowchart of a method for autonomously landing an aircraft according to the inventive concepts disclosed herein.

Referring to FIG. 5, a flowchart of a method for autonomously landing an aircraft according to the inventive concepts disclosed herein is shown. On-board an aircraft, a first neural network 510 receives runway data 500, a video stream 502 corresponding to an angle suitable for a landing approach and specifically corresponding to a view through a HUD, and aircraft state data 504 corresponding to a current energy state of the aircraft. The first neural network 510 identifies 506 environmental landmarks to confirm the identity of the desired runway and searches 508 for environmental obstacles. In at least one embodiment, the identified landmarks and obstacles may then be output 512 to a separate autopilot or other avionics system.

In at least one embodiment, a second neural network 522 may receive 514 a flight path vector, either from a system that renders the flight path vector on a HUD, or potentially derived from a video stream of the HUD. In at least one embodiment, the second neural network also receives 516 a flight director corresponding to a disparity between a desired aircraft vector to execute an approach to the runway and an actual, current aircraft vector. The second neural network 522 compares 518 the flight path vector to a computed, desired runway vector or the flight director to identify a disparity. The second neural network 522 then determines 520 one or more flight control inputs to align the flight path vector to the desired runway vector or flight director and sends the output 524 to the separate autopilot or other avionics system.

In at least one embodiment, the first neural network 510 output 512 and second neural network 522 output 524 are compared or correlated to determine 526 if there is any safety conflict with one or more environmental obstacles. Any such conflict may be output 528 to the separate autopilot or avionics system, or to the first neural network 510 and/or the second neural network 522 as inputs to adjust the determined 520 flight control inputs.

An autonomous system according to embodiments of the present disclosure may operate in a mixed-autonomy environment in a manner predictable to other surrounding manned aircraft, and therefore integrate seamlessly in environments where other pilots might be operating.

While the foregoing descriptions have been in the context of an autonomous landing system, it is contemplated that the systems and methods could also be implemented as a pilot monitoring tool. In such an implementation, the flight commands generated by the system would not be implemented directly, but would be compared to actual inputs from a pilot to gauge such pilot's attentiveness and decision making. Such system may include alarm features to alert the pilot of a dangerous deviation from what the system considers to be the appropriate response.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
at least one camera;
at least one processor in data communication with a memory storing processor executable code for configuring the at least one processor to:
receive a video stream from the camera;
receive data corresponding to a desired runway and an area surrounding the desired runway;
receive aircraft state data corresponding to an energy state of an aircraft;
identify, via at least one neural network, a plurality of landmarks in at least one frame of the video stream, the plurality of landmarks corresponding to components of the desired runway and the area surrounding the desired runway;
determine, via the at least one neural network, that the video stream depicts the desired runway;
determine, via the at least one neural network, if the video stream depicts a stable approach vector to the desired runway based on the aircraft state data and video stream by calculating a flight path vector of the aircraft from the aircraft state data, calculating an approach vector, and comparing the flight path vector to the approach vector;
if the at least one neural network determines that the video stream does not depict a stable approach vector:
produce an output that indicates a go-around operation is advisable;
determine, via a first neural network in the at least one neural network, a stable approach vector based on the aircraft state data;
determine, via a second neural network, one or more flight control inputs to align the flight path vector with the stable approach vector; and
determine if the stable approach vector from the first neural network and the flight control inputs from the second neural network conflict;
identify, via the at least one neural network, one or more landing obstacles in the video stream; and
produce an output that executes a go-around operation if the at least one neural network identifies one or more landing obstacles.

2. The computer apparatus of claim 1, wherein:
the at least one neural network comprises a first neural network;
the at least one processor is further configured to:
if the at least one neural network determines that the video stream does not depict a stable approach vector, determine, via the second neural network, a second stable approach vector based on the aircraft state data; and determine, via the second neural network, one or more flight control inputs to align the flight path vector with the second stable approach vector.

3. The computer apparatus of claim 2, wherein:
the at least one processor is further configured to:
receive data corresponding to a flight director;
identify, via the second neural network, a disparity between the flight path vector and the flight director; and
determine one or more flight control inputs to align the flight path vector to the flight director based on the identified disparity.

4. The computer apparatus of claim 2, wherein the at least one processor is further configured to:
align, via either the first neural network or the second neural network, the video stream with the flight path vector by transforming the video stream to account for a difference in an angle of the at least one camera and a line of sight of a pilot; and
determine, via either the first neural network or the second neural network, an alternate stable approach vector based on the aligned video stream and flight path vector.

5. The computer apparatus of claim 1, wherein the at least one processor is further configured to:
continuously monitor, via the first neural network, the video stream to determine if one or more pilot inputs produce an unstable approach vector; and
execute a warning procedure indicating the unstable approach vector.

6. A method comprising:
receiving, with an on-aircraft processor, data corresponding to a flight path vector;
receiving, with an on-aircraft processor, a video stream from a camera corresponding to a landing approach;
receiving, with an on-aircraft processor, data corresponding to a desired runway and an area surrounding the desired runway;
receiving, with an on-aircraft processor, aircraft state data corresponding to an energy state of an aircraft from one or more connected avionics systems;
identifying, via a first neural network, a plurality of landmarks in at least one frame of the video stream, the plurality of landmarks corresponding to components of the desired runway and the area surrounding the desired runway;
determining, via the first neural network, that the video stream depicts the desired runway;
determining, via the first neural network, if the video stream depicts a stable approach vector to the desired runway based on the aircraft state data and video stream by calculating a flight path vector of the aircraft from the aircraft state data, calculating an approach vector, and comparing the flight path vector to the approach vector;
if the first neural network determines that the video stream does not depict a stable approach vector, determining, via the first neural network, a stable approach vector based on the aircraft state data;
determining, via a second neural network, one or more flight control inputs to align the flight path vector with the stable approach vector;
determining if the stable approach vector from the first neural network and the flight control inputs from the second neural network conflict;
identifying, via the first neural network, one or more landing obstacles in the video stream; and
producing an output that executes a go-around operation if the first neural network identifies one or more landing obstacles.

7. The method of claim 6, further comprising determining if the one or more flight control inputs produce a safety conflict with one or more environmental obstacles.

8. The method of claim 6, further comprising:
receiving data corresponding to a flight director; and
identifying, via the second neural network, a disparity between the flight path vector and the flight director.

9. The method of claim 6, further comprising:
aligning, via either the first neural network or the second neural network, the video stream with the flight path vector by transforming the video stream to account for a difference in an angle of the at least one camera and a line of sight of a pilot; and
determining, via either the first neural network or the second neural network, an alternate stable approach vector based on the aligned video stream and flight path vector.

10. The method of claim 6, further comprising:
continuously monitoring, via the first neural network, the video stream to determine if one or more pilot inputs produce an unstable approach vector; and
executing a warning procedure indicating the unstable approach vector.

11. An aircraft comprising:
a head-up display (HUD) at least one camera;
at least one processor in data communication with a memory storing processor executable code for configuring the at least one processor to:
receive data corresponding to a flight path vector;
receive a video stream from the camera;
receive data corresponding to a desired runway and an area surrounding the desired runway;
receive aircraft state data corresponding to an energy state of an the aircraft;
identify, via a first neural network, a plurality of landmarks in at least one frame of the video stream, the plurality of landmarks corresponding to components of the desired runway and the area surrounding the desired runway;
determine, via the first neural network, that the video stream depicts the desired runway;
determine, via the first neural network, if the video stream depicts a stable approach vector to the desired runway based on the aircraft state data and video stream by calculating a flight path vector of the aircraft from the aircraft state data, calculating an approach vector, and comparing the flight path vector to the approach vector;
if the first neural network determines that the video stream does not depict a stable approach vector, determine, via the first neural network, a stable approach vector based on the aircraft state data;
determine, via a second neural network, one or more flight control inputs to align the flight path vector with the stable approach vector;
determine if the stable approach vector from the first neural network and the flight control inputs from the second neural network conflict;
identify, via the first neural network, one or more landing obstacles in the video stream; and
produce an output that executes a go-around operation if the first neural network identifies one or more landing obstacles.

12. The aircraft of claim 11, wherein:
the at least one processor is further configured to:
- receive data corresponding to a flight director; and
- identify, via the second neural network, a disparity between the flight path vector and the flight director.

13. The aircraft of claim 11, wherein the at least one processor is further configured to:
- align, via either the first neural network or the second neural network, the video stream with the flight path vector by transforming the video stream to account for a difference in an angle of the at least one camera and a line of sight of a pilot; and
- determine, via either the first neural network or the second neural network, an alternate stable approach vector based on the aligned video stream and flight path vector.

14. The aircraft of claim 11, wherein the at least one processor is further configured to:
- continuously monitor, via the first neural network, the video stream to determine if one or more pilot inputs produce an unstable approach vector; and
- execute a warning procedure indicating the unstable approach vector.

\* \* \* \* \*